United States Patent
Brooks et al.

(10) Patent No.: US 9,639,145 B2
(45) Date of Patent: May 2, 2017

(54) METHOD FOR DETERMINING WHETHER TO ENTER A S3 STATE BASED ON USER-DEFINED PERMISSIBLE S3 PERIOD DURING AN ALWAYS ON MODE

(71) Applicant: Hewlett-Packard Development Company, L.P., Houston, TX (US)

(72) Inventors: Robert C Brooks, Houston, TX (US); Michael R Durham, Tomball, TX (US); Mark A Piwonka, Tomball, TX (US); Gregory P Ziarnik, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/898,247

(22) PCT Filed: Jun. 20, 2013

(86) PCT No.: PCT/US2013/046696
§ 371 (c)(1),
(2) Date: Dec. 14, 2015

(87) PCT Pub. No.: WO2014/204461
PCT Pub. Date: Dec. 24, 2014

(65) Prior Publication Data
US 2016/0139657 A1 May 19, 2016

(51) Int. Cl.
*G06F 1/32* (2006.01)
*G06F 9/54* (2006.01)

(52) U.S. Cl.
CPC .......... *G06F 1/3296* (2013.01); *G06F 1/3228* (2013.01); *G06F 1/3287* (2013.01); *G06F 9/542* (2013.01); *Y02B 60/1282* (2013.01)

(58) Field of Classification Search
CPC .. G06F 1/3296; G06F 1/3228; Y02B 60/1282
(Continued)

(56) References Cited

U.S. PATENT DOCUMENTS 6,408,395 B1 * 6/2002 Sugahara .............. G06F 1/3203
713/310
7,069,462 B2 * 6/2006 Owen ................... G06F 1/3203
713/300
(Continued)

FOREIGN PATENT DOCUMENTS

EP 1564629 A2 8/2005

OTHER PUBLICATIONS

Alexander W. Min et al., "Irnproving Energy Efficiency for Mobile Platforms by Exploiting Low-power Sleep States," CF' 12, May 2012, pp. 1-10, ACM.
(Continued)

*Primary Examiner* — Vincent Tran
(74) *Attorney, Agent, or Firm* — HP.Inc. Patent Department

(57) ABSTRACT

In one example in accordance with the present disclosure, a computing device is provided. The computing device includes an interface module and a power management module. The interface module is to provide a user interface that facilitates enabling and disabling of an always on feature, and further facilitates configuration of a permissible advanced configuration and power interface (ACPI) S3 state period. The power management module to receive a request to enter an ACPI S3 state, determine whether the always on feature is enabled, and in response to determining that the always on feature is enabled, determine whether the computing device is within a user-defined permissible ACPI S3 state period. In response to determining that the computing device is within the user-defined permissible ACPI S3 state
(Continued)

period, the power management module is to set a wake event and cause the computing device to enter the ACPI S3 state.

15 Claims, 4 Drawing Sheets

(58) Field of Classification Search
USPC .......................................................... 713/323
See application file for complete search history.

(56) References Cited

U.S. PATENT DOCUMENTS

| | | | |
|---|---|---|---|
| 7,590,871 B2* | 9/2009 | Morisawa | G06F 1/14 |
| | | | 713/300 |
| 8,250,384 B2 | 8/2012 | Borghetti et al. | |
| 8,255,724 B2 | 8/2012 | Das | |
| 8,271,054 B2 | 9/2012 | Bockus et al. | |
| 2003/0145242 A1* | 7/2003 | Derocher | G06F 1/3203 |
| | | | 713/320 |
| 2005/0044241 A1 | 2/2005 | Dunstan | |
| 2007/0059014 A1* | 3/2007 | Oka | G03G 21/02 |
| | | | 399/79 |
| 2008/0209247 A1* | 8/2008 | Thelander | G06F 1/3203 |
| | | | 713/323 |
| 2009/0040314 A1* | 2/2009 | Chan | H04N 5/782 |
| | | | 348/207.1 |
| 2010/0262854 A1 | 10/2010 | Bridgwater et al. | |
| 2011/0078475 A1 | 3/2011 | Juenemann et al. | |
| 2011/0249022 A1 | 10/2011 | Poornachandran et al. | |
| 2012/0315960 A1* | 12/2012 | Kim | H04W 52/0254 |
| | | | 455/574 |
| 2013/0002339 A1 | 1/2013 | Paul et al. | |
| 2013/0067059 A1 | 3/2013 | Gatta et al. | |

OTHER PUBLICATIONS

PCT Search Report/Written Opinion—Application No. PCT/US2013/046696 dated Mar. 27, 2014—11 pages.
Farshad: "Set Time Or Day Based Windows Power Plans On Your PC With SetPower", Apr. 7, 2011 (Apr. 7, 2011), pp. 1-4, XP055313924.
Microsoft; "Away Mode in Windows Vista", Feb. 1, 2007 (Feb. 1, 2007), XP055313930~13 pages.
"Advanced Configuration and Power Interface Specification Rev 2.0", First 26 pages of 481 pages, Jul. 27, 2000~book.

* cited by examiner

METHOD FOR DETERMINING WHETHER TO ENTER A S3 STATE BASED ON USER-DEFINED PERMISSIBLE S3 PERIOD DURING AN ALWAYS ON MODE

BACKGROUND

In today's computing environment, computing devices are required to conduct more processes and provide more capabilities than ever before. For example, users frequently desire computing devices that can process multiple applications in parallel, provide high quality graphics, support multiple displays, and provide advanced interface capabilities, to name a few. In addition to these, users also frequently desire rapid initiation and low power consumption capabilities. These features, which are often times competing against one another, make it difficult for designers to satisfy each and every of the user's desires. In most cases, some features are sacrificed for others to provide a reasonable product in terms of cost and complexity.

BRIEF DESCRIPTION OF THE DRAWINGS

Examples are described in the following detailed description and in reference to the drawings, in which.

DETAILED DESCRIPTION

Figure 1:
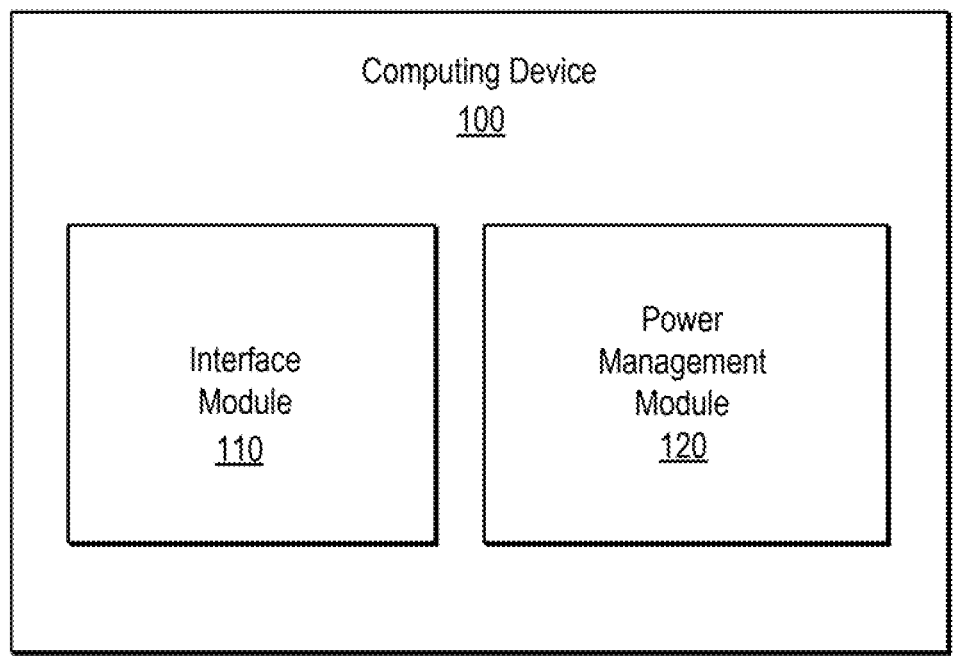
FIG. 1 depicts an example computing device in accordance with an implementation.

As mentioned above, rapid initiation and low power consumption capabilities are important to many users. In recognition of this importance, various companies have promoted low power idle states while in an advanced configuration and power interface (ACPI) S0 state (e.g., "Connected Standby") which power down some components (e.g., the display) while leaving many other components powered-up (e.g., the memory) so that the device can rapidly respond to user interaction and provide an always on experience.

These current low power idle states are generally directed to battery-powered mobile devices such as smartphones and tablets, and are generally not suitable for other computing devices such as desktops and workstations for various reasons. For instance, in a desktop environment, it is difficult to reduce power consumption enough to comply with these low power requirements. To do so, it would generally require switching components, such as the processor, to a low power architecture, which would likely reduce performance. Moreover, many users do not want their desktop computing device utilizing power all day and every day with an "always on" experience. Among other things, this may increase electrical bills, reduce the life expectancy of the computing device, and have a negative impact on the environment.

Aspects of the present disclosure attempt to address the above-mentioned problem by providing an approach to provide the "always on" experience in at least a desktop/laptop/workstation environment, but without utilizing power all day and every day. More specifically, and as described below with reference to various figures and examples, aspects of the present disclosure provide the "best of both worlds" by providing a user with an "always on" experience, but at the same time providing power savings by employing standby/hibernate modes. The user is in control of when to enable the always on experience, and further in control of the dates and times to enter/exit the standby, hibernate, and always on power modes. Hence, a user may customize the computing device based on the user's unique schedule, and therefore provide the always on experience at the most optimal times, and provide power savings at other times.

In one example in accordance with aspects of the present disclosure, a method is provided. The method comprises entering, by a computing device, an advanced configuration and power interface (ACPI) S0 state. In response to receiving a request to enter an ACPI S3 state, determining whether an always on feature is enabled. If the always on feature is not enabled, entering the ACPI S3 state. If the always on feature is enabled, determining whether the computing device is within a user-defined permissible ACPI S3 state period. If the computing device is not within a user-defined permissible ACPI S3 state period, continuing computing device operation in the ACPI S0 state. If the computing device is within the user-defined permissible ACPI S3 state period, setting a wake event and entering the ACPI S3 state.

In another example in accordance with aspects of the present disclosure, a computing device is provided. The computing device comprises an interface module to provide a user interface that facilitates enabling and disabling of an always on feature, and further facilitates configuration of a permissible advanced configuration and power interface (ACPI) S3 state period. The computing device further comprises a power management module to receive a request to enter an ACPI S3 state and determine whether the always on feature is enabled. In response to determining that the always on feature is enabled, the power management module is to determine whether the computing device is within a user-defined permissible ACPI S3 state period. In response to determining that the computing device is within the user-defined permissible ACPI S3 state period, the power management module is to set a wake event and cause the computing device to enter the ACPI S3 state.

In yet another example in accordance with aspects of the present disclosure, a non-transitory machine-readable medium is provided. The machine-readable medium comprises instructions which, when executed, cause a computing device to provide a user interface that facilitates enabling and disabling of an always on feature, and further facilitates configuration of a permissible advanced configuration and power interface (ACPI) S3 state period, wherein the permissible ACPI S3 state period is configurable based on at least date and time parameters. The instructions, when executed, further cause the computing device to receive a request to enter an ACPI S3 state, determine whether an always on feature is enabled, and determine whether the computing device is within the user-defined permissible ACPI S3 state period, in response to determining that the computing device is within the user-defined permissible ACPI S3 state period, the instructions may cause the computing device to set a wake event to occur at the end of the user-defined permissible ACPI S3 state period, and enter the ACPI S3 state.

As used herein, the term "always on feature" should be generally understood as meaning a power control feature which, when enabled, facilitates selective restrictions based on time/date with respect to entering/exiting an always on power mode (e.g., the ACPI S0 state), a standby power mode (e.g., the ACPI S3 state), and/or a hibernate mode (e.g., the ACPI S4 state).

As used herein, the term "user" should be generally understood as an individual that interacts with the computing device. The interaction may be from a location local to the computing device and/or from a location remote with respect to the computing device. In some examples, the user may be an administrator that manages aspects of the computing device.

FIG. 1 depicts an example computing device 100 in accordance with an implementation. The computing device 100 comprises an interface module 110 and a power management module 120. It should be readily apparent that the computing device 100 is a generalized illustration and that other elements may be added or existing elements may be removed, modified, or rearranged without departing from the scope of the present disclosure. For example, other components such as a network interface, display, fans, and/or other common computing device components may be included, and are not shown for the sake of clarity and brevity.

The computing device 100 may be understood generally as a computer such as a desktop computer, workstation computer, laptop computer, AiO computer, or another similar computing device. The interface module 110 and a power management module 120 reside within the computing device 100. Depending on the implementation, the interface module 110 and a power management module 120 may be implemented in hardware, software, or a combination of both. For example, the interface module 110 and a power management module 120 may comprise instructions executable by a processing device (not shown) to cause the computing device 100 to conduct functions discussed herein. Alternatively or in addition, the interface module 110 and a power management module 120 may comprise a hardware equivalent such as an application specific integrated circuit (ASIC), a logic device (e.g., PLD, CPLD, FPGA, PLA, PAL, GAL, etc.), or combination thereof configured to conduct functions discussed herein. It should be understood that, in some implementations, the interface module 110 and a power management module 120 may be integrated in common components, while in other implementations, the interface module 110 and a power management module 120 may be within discrete components.

In one example implementation, the interface module 110 is to provide a user interface to the user via a display. The interface may be in the form of a graphical user interface (GUI), command line interface (CLI), or the like. This interface may facilitate enabling and disabling of an always on feature. The always on feature may keep the computing device in an on state during specific times defined by the user. For example, the always on feature may keep the computing device in an ACPI S0 state during user-defined time periods (e.g., Monday-Friday, 8:00 am-5:00 pm). As used herein, the "ACPI S0 state" should be generally understood as referring to a system on state where (i) the processor is powered and ready to execute instructions, (ii) the memory is powered and capable of being read from and written to, and (iii) the hard drive is powered on and capable of being read from and written to (see, e.g., ACPI specification, Revision 5.0).

The interface may further facilitate configuration of a permissible always on and/or standby/hibernate state periods. For example, the interface may allow the user to select when the computing device 100 should remain on (e.g., Monday-Friday, 8:00 am-5:00 pm). In some implementations, this may comprise defining when the computing device should remain in the ACPI S0 state (e.g., Monday-Friday, 8:00 am-5:00 pm). Alternatively or in addition, the interface may allow the user to select when the computing device may enter a standby and/or hibernate state while the always on feature is enabled. For example, this may comprise defining when the computing device may enter the ACPI S3 state (e.g., Monday-Friday 5:01 pm-7:59 am; Saturday and Sunday all day). Similarly, this may comprise defining when the computing device may enter the ACPI S4 state (e.g., Monday-Friday 5:01 pm-7:59 am; Saturday and Sunday all day). As used herein, the "ACPI S3 state" should be generally understood as referring to a system standby state where most components are powered down, but the system memory (i.e. DRAM) remains powered thereby maintaining its contents (see, e.g., ACPI specification, Revision 5.0). As used herein, the "ACPI S4 state" should be generally understood as referring to a system hibernate state where the contents of memory are written to the hard drive and most components, including system memory, are powered down (see, e.g., ACPI specification, Revision 5.0).

Turning now to the power management module 120, in various implementations, the power management module 120 is to receive a request to enter a different power state, and check the current status of the always on feature (i.e., enabled or disabled) and determine an appropriate action based on at least one of the current status of the always on feature and the user-defined permissible always on and/or standby/hibernate state periods. For example, the computing device 100 may be operating normally in an ACPI S0 state. Due to idleness for a predetermined time period, the operating system may request to enter a standby state (e.g., an ACPI S3 state). The power management module 120 may receive this request and determine whether the always on feature is enabled. In response to determining that the always on feature is enabled, the power management module 120 may determine whether the computing device is within a user-defined permissible period to enter a standby state (e.g., an ACPI S3 state). In response to determining that the computing device 100 is within the user-defined permissible period to enter a standby state (e g., an ACPI S3 state), the power management module 120 may cause the computing device 100 to enter the standby state (e.g., an ACPI S3 state). In addition, the power management module 120 may set a wake event to occur at the end of the user-defined permissible ACPI S3 state period. For example, the power management module 120 may cause the computing device 100 to enter the standby state and set a wake event to occur at 8:00 am in accordance with the start of a user defined period for the always on feature.

Figure 2:
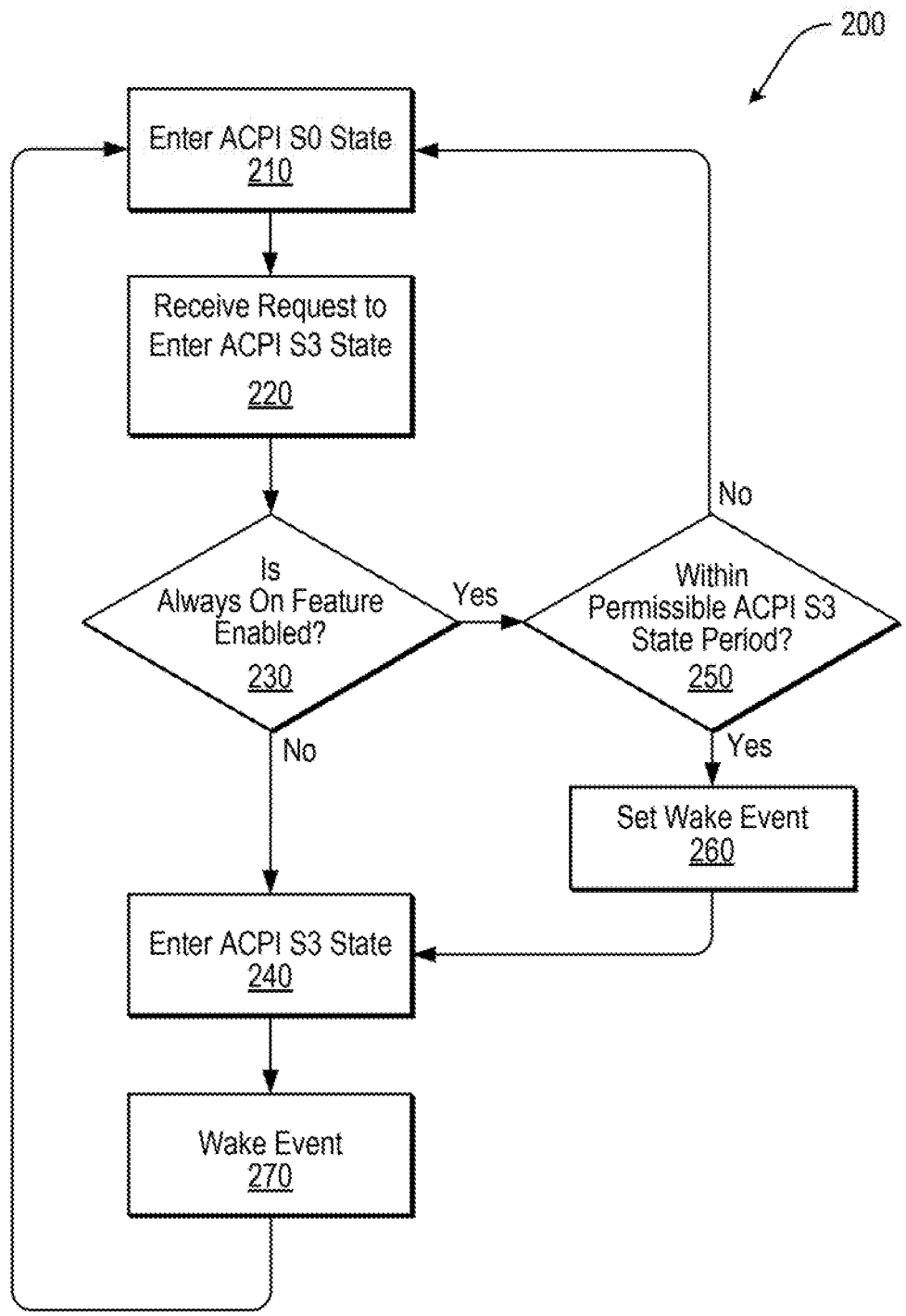
FIG. 2 depicts a process flow diagram of an example process that may be conducted by the computing device and/or associated modules of FIG. 1 in accordance with an implementation.

Turning now to FIG. 2, this process flow diagram 200 depicts an example process that may be conducted by the computing device and/or associated modules of FIG. 1 in accordance with an implementation. It should be readily apparent that the processes depicted in FIG. 2 (as well as other process flow diagrams herein) represents generalized illustrations, and that other processes may be added or existing processes may be removed, modified, or rearranged without departing from the scope and spirit of the present disclosure. In addition, it should be understood that the processes depicted may represent instructions stored on a processor-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components. Furthermore, the flow diagrams are not intended to limit the implementation of the present disclosure, but rather the flow diagrams illustrate functional information that one skilled in the art could use to design/fabricate circuits, generate software, generate logic, or use a combination of hardware and software to perform the illustrated processes.

The process 200 may begin at block 210, where the device enters or continues normal operation in an ACPI S0 state. At block 220, in response to computing device idleness for a predefined time period, a request to enter the ACPI S3 state is received. In response to receiving this request, at block 230, a determination is made as to whether the always on feature is enabled. As mentioned above, this feature may be enabled by the user via an interface such as a GUI. At block 240, in response to determining that the always on feature is not enabled, the computing device enters the ACPI S3 state. By contrast, in response to determining that the always on feature is enabled, at block 250, the computing device determines whether the computing device is within a user-defined permissible ACPI S3 state time period. If the computing device determines that it is not within the user-defined permissible ACPI S3 period, the computing device continues operation in the ACPI S0 state at block 210. On the other hand, if the computing device determines that it is within the user-defined permissible ACPI S3 period, at block 260, the computing device sets a wake event to exit the ACPI S3 state, and enters the ACPI S3 state. Thereafter, if a wake event occurs at block 270, the computing device enters the ACPI S0 state at block 210. Hence, the approach enables the computing device to deliver the always on experience, but only at time periods defined by the user when the always on feature is enabled, with the remaining time periods allowing for standby/hibernate states to mitigate power consumption.

Figure 3:
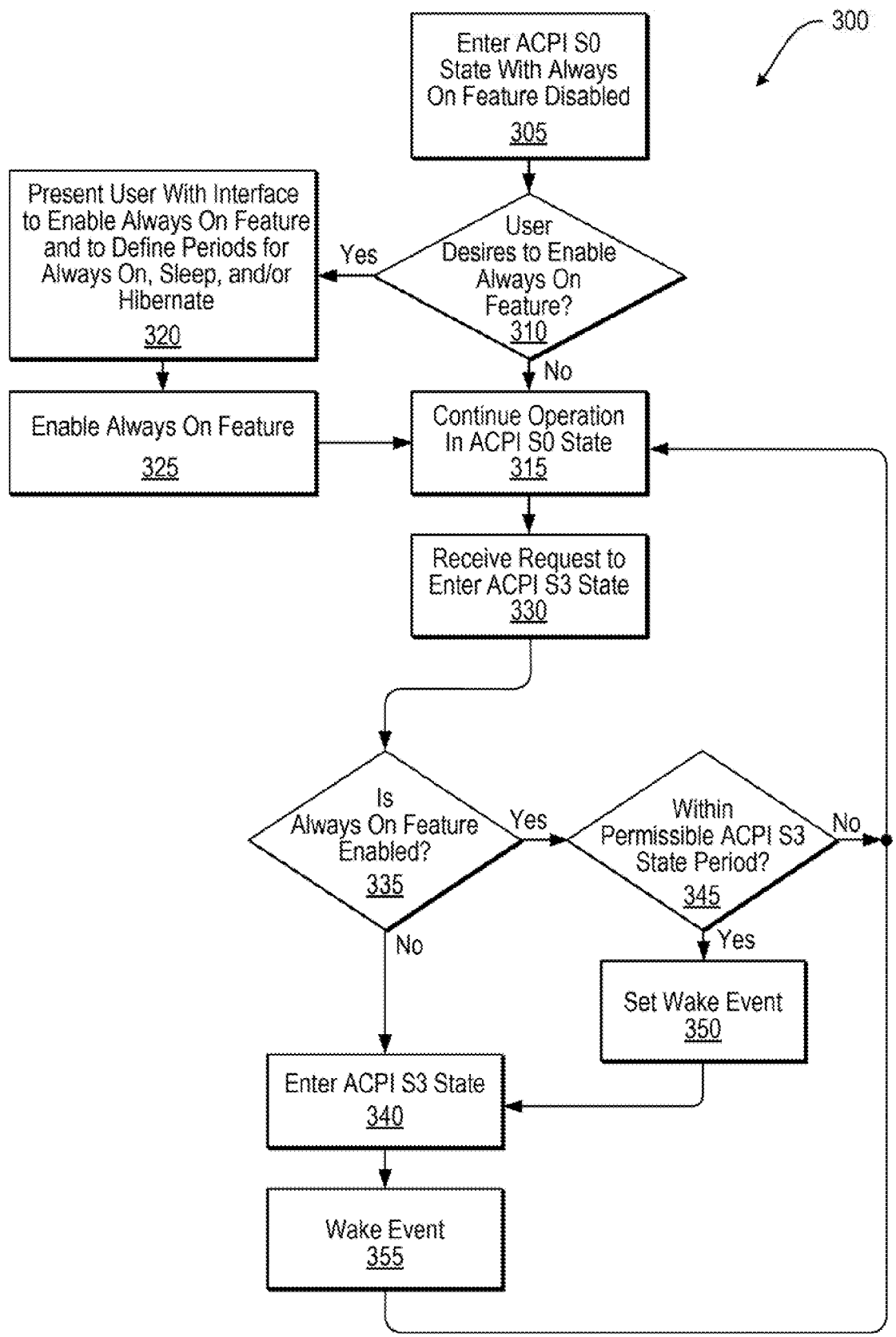
FIG. 3 depicts another process flow diagram that may be conducted by the computing device and/or associated modules of FIG. 1 in accordance with an implementation.

Turning now to FIG. 3, this process flow diagram 300 depicts another example process that may be conducted by the computing device and/or associated modules of FIG. 1 in accordance with an implementation. The process 300 may begin at block 305, wherein the computing device enters an ACPI S0 state with the above-described always on feature disabled. At block 310, a determination is made as to whether the user desires to enable the always on feature. If the user does not desire to enable the always on feature, at block 315, the computing device continues operation in the ACPI S0 state. By contrast, if the user does desire to enable the always on feature, at block no, the user is presented with an interface (e.g., a GUI) that facilitates enabling/disabling the always on feature. Moreover, the interface facilitates user definition of permissible time periods for always on, sleep, and/or hibernate. For example, the user may define that the computing device should remain on (e.g., in the ACPI S0 state) Monday-Friday from 8:00 am-5:00 pm. Alternatively or in addition, the user may define that the computing device only enter a standby and/or hibernate state (e.g., ACPI S3 and/or S4 state) Monday-Friday 5:01 pm-7:59 am and Saturday and Sunday all day. With specific respect to these example dates/times, the user would therefore be setting the computing device such that it will be fully on during typical work hours and never enter standby/hibernate mode, but when outside these work hours, the computing device would be allowed to enter the standby/hibernate mode. Moreover, with specific respect to these example dates/times, the user would be setting the computing device to automatically wake up from standby/hibernate mode at the beginning of the defined work hours. This approach enables the computing device to deliver the always on experience, but only at time periods defined by the user and when the always on feature is enabled, with the remaining time periods allowing for standby/hibernate states to mitigate power consumption. It should be understood that these dates/times are merely examples, and the user may define time periods based on particular days, weeks, months, and years. Moreover, the user may define a plurality of time periods. For example, the user may define one set of time periods for a first week, and a different set of time periods for a second week.

At block 325, in response to the user interacting with the interface as described above with respect to block 320, the always on feature is enabled. Then, at block 315, the computing device continues operation in ACPI S0 state. At block 330, in response to computing device idleness for a predefined time period, a request to enter the ACPI S3 state is received. In response to receiving this request, at block 335, a determination is made as to whether the always on feature is enabled. At block 340, in response to determining that the always on feature is not enabled, the computing device enters the ACPI S3 state. By contrast, in response to determining that the always on feature is enabled, at block 345, the computing device determines whether the computing device is within a user-defined permissible ACPI S3 state time period. If the computing device determines that it is not within the user-defined permissible ACPI S3 period, the computing device continues operation in the ACPI S0 state at block 315. On the other hand, if the computing device determines that it is within the user-defined permissible ACPI S3 period, at block 350, the computing device sets a wake event to exit the ACPI S3 state, and enters the ACPI S3 state at block 340. Thereafter, if a wake event occurs at block 355, the computing device enters the ACPI S0 state at block 315.

Figure 4:
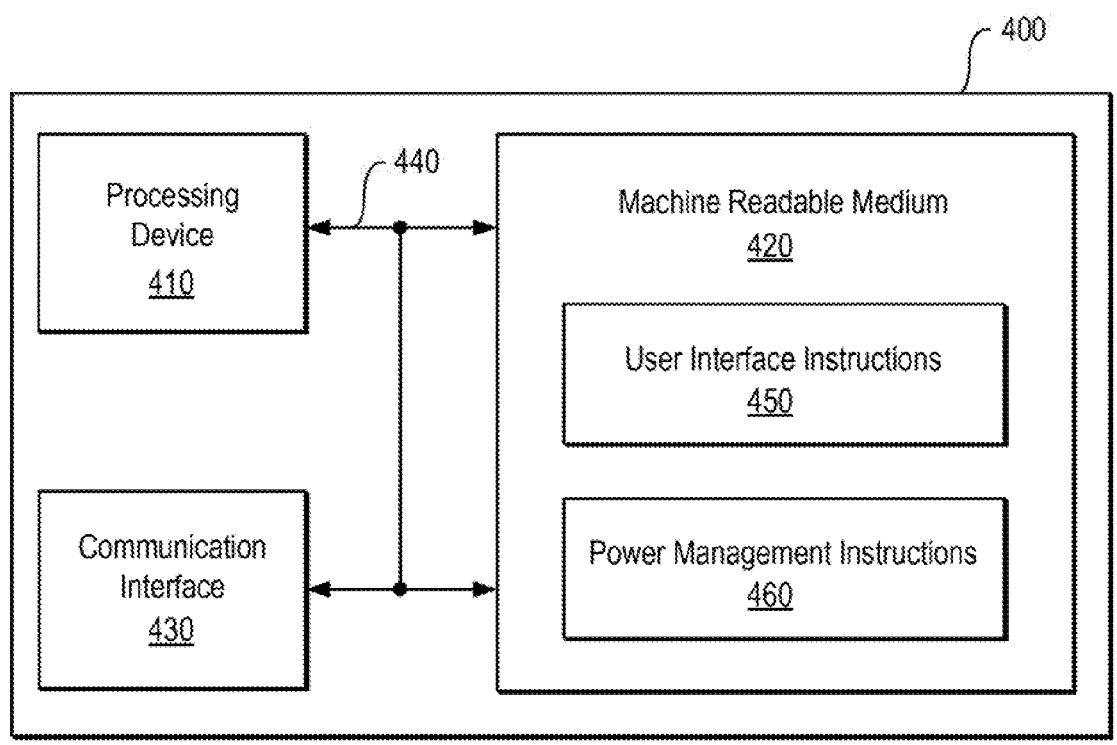
FIG. 4 depicts an example computing system comprising a machine-readable medium in accordance with an implementation.

FIG. 4 depicts an example computing device 400 in accordance with an implementation. The computing device 400 may be, for example, a laptop computer, desktop computer, AiO computer, workstation computer, gaming device, scientific instrument, or another similar computing device. The computing system 400 comprises a processing device 410, a non-transitory machine readable medium 420, and a communication interface 430. The processing device 410, machine-readable medium 420, and communication interface 430 are communicatively coupled via a bus 440.

The communication interface 430 may comprise, for example, transmitters, receivers, transceivers, antennas ports, PHYs, and/or other communication components.

The machine-readable medium 420 may correspond to any typical storage device that stores instructions, such as programming code or the like. For example, the non-transitory machine-readable medium 420 may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some implementations, the instructions may be part of an installation package that may be executed by the processing device 410. In this case, the non-transitory machine-readable medium 420 may be a portable medium such as a CD, DVD, or flash drive or a memory maintained by a server from which the installation package can be downloaded and installed. In another implementation, the instructions may be part of an application or application already installed on the computing device 400.

The processing device 410 may be at least one of a processor, central processing unit (CPU), a semiconductor-based microprocessor, or the like. It may retrieve and execute instructions such as the user interface instructions 450 and the power management instructions 468 to cause the computing device 400 to operate in accordance with the foregoing description of the user interface module and power management module, respectively. In one example implementation, the processing device 410 may access the machine-readable medium 420 via the bus 440 and execute the user interface instructions 450 and the power management instructions 460 to cause the computing device 400 to provide a user interface that facilitates enabling and disabling of an always on feature, and further facilitates configuration of a permissible advanced configuration and power interface (ACPI) S3 state period, wherein the permissible ACPI S3 state period is configurable based on at least date and time parameters. The instructions, when executed, further cause the computing device to receive a request to enter an ACPI S3 state, determine whether an always on feature is enabled, and determine whether the computing device is within the user-defined permissible ACPI S3 state period. In response to determining that the computing device is within the user-defined permissible ACPI S3 state period, the instructions may cause the computing device to set a wake event to occur at the end of the user-defined permissible ACPI S3 state period, and enter the ACPI S3 state.

The foregoing describes a novel and previously unforeseen approach to control computing device power states. More specifically, the present disclosure provides the "best of both worlds" by providing a user with an "always on" experience in a desktop/laptop environment, but at the same time providing power savings by employing standby/hibernate modes. The user is in control of when to enable the always on experience, and further in control of the dates and times to enter/exit the standby, hibernate, and always on power modes. Hence, a user may customize the computing device based on the user's unique schedule, and therefore provide the always on experience at the most optimal times, and provide power savings at other times.

While the above disclosure has been shown and described with reference to the foregoing examples, it should be understood that other forms, details, and implementations may be made without departing from the spirit and scope of the disclosure that is defined in the following claims.

What is claimed is:
1. A method, comprising:
  entering, by a computing device, an advanced configuration and power interface (ACPI) S0 state;
  in response to receiving a request to enter an ACPI S3 state, determining whether an always on feature is enabled,
    wherein, if the always on feature is not enabled, entering the ACPI S3 state, and
    wherein, if the always on feature is enabled, determining whether the computing device is within a user-defined permissible ACPI S3 state period,
      wherein, if the computing device is not within a user-defined permissible ACPI S3 state period, continuing computing device operation in the ACPI S0 state, and
      wherein, if the computing device is within the user-defined permissible ACPI S3 state period, setting a wake event and entering the ACPI S3 state.

2. The method of claim 1, wherein setting the wake event comprises setting the wake event to occur at the end of the user-defined permissible ACPI S3 state period.

3. The method of claim 1, further comprising:
  providing a user interface by the computing device, wherein the interface facilitates enabling and disabling of the always on feature.

4. The method of claim 3, wherein the interface further facilitates configuration of the permissible ACPI S3 state period, wherein the permissible ACPI S3 state period is configurable based on at least date and time parameters.

5. The method of claim 1, wherein the computing device comprises at least one of a desktop computer, a workstation computer, and a laptop computer.

6. A computing device, comprising:
  an interface module to
    provide a user interface that facilitates enabling and disabling of an always on feature, and further facilitates configuration of a permissible advanced configuration and power interface (ACPI) S3 state period; and
  a power management module to
    receive a request to enter an ACPI S3 state,
    determine whether the always on feature is enabled,
    in response to determining that the always on feature is enabled, determine whether the computing device is within a user-defined permissible ACPI S3 state period, and
    in response to determining that the computing device is within the user-defined permissible ACPI S3 state period, set a wake event and cause the computing device to enter the ACPI S3 state.

7. The computing device of claim 6, wherein, in response to determining that the always on feature is not enabled, the power management module is to cause the computing device to enter the ACPI S3 state.

8. The computing device of claim 6, wherein, in response to determining that the computing device is not within the user-defined permissible ACPI S3 state period, the power management module is to cause the computing device to continue operation in an ACPI S0 state.

9. The computing device of claim 6, wherein the permissible ACPI S3 state period is configurable based on at least date and time parameters.

10. The computing device of claim 6, wherein the computing device comprises at least one of a desktop computer, a workstation computer, and a laptop computer.

11. A non-transitory machine-readable medium comprising instructions which, when executed, cause a computing device to:
  provide a user interface that facilitates enabling and disabling of an always on feature, and further facilitates configuration of a permissible advanced configuration and power interface (ACPI) S3 state period, wherein the permissible ACPI S3 state period is configurable based on at least date and time parameters;
  receive a request to enter an ACPI S3 state,
  determine whether an always on feature is enabled,
  determine whether the computing device is within the user-defined permissible ACPI S3 state period, and
  in response to determining that the computing device is within the user-defined permissible ACPI S3 state period, set a wake event to occur at the end of the user-defined permissible ACPI S3 state period, and enter the ACPI S3 state.

12. The non-transitory machine-readable medium of claim 11, wherein the instructions, when executed, further cause the computing device to:

in response to determining that the computing device is not within the user-defined permissible ACPI S3 state period, continue operation in an ACPI S0 state.

13. The non-transitory machine-readable medium of claim 11, wherein the user interface facilitates configuration of a plurality of permissible ACPI S3 state periods.

14. The non-transitory machine-readable medium of claim 11, wherein the user interface facilitates configuration of the permissible ACPI S3 state periods such that the computing device never enters the ACPI S3 state.

15. The non-transitory machine-readable medium of claim 11, wherein the wake event causes the computing device to enter an ACPI S0 state.

* * * * *